United States Patent [19]

Verhulst et al.

[11] Patent Number: 4,676,046
[45] Date of Patent: Jun. 30, 1987

[54] ASSEMBLY FOR GUIDING WRAP MATERIAL FROM THE REAR OF A BALER TO A BALE-FORMING CHAMBER INLET

[75] Inventors: Michael J. Verhulst; Henry D. Anstey, both of Ottumwa, Iowa

[73] Assignee: Deere & Company, Moline, Ill.

[21] Appl. No.: 883,239

[22] Filed: Jul. 8, 1986

[51] Int. Cl.⁴ .................. B65B 11/04; B65B 41/12
[52] U.S. Cl. .......................... 53/118; 53/389; 53/587; 226/88; 226/183; 271/188; 271/209; 271/274; 493/461; 493/465
[58] Field of Search .......... 53/118, 389, 587; 100/88; 228/88, 183; 271/188, 209, 274; 493/461, 463, 465

[56] References Cited

U.S. PATENT DOCUMENTS

| | | | |
|---|---|---|---|
| 500,536 | 6/1893 | Crowell | 53/118 |
| 2,101,328 | 12/1937 | Broadmeyer | 271/188 |
| 3,510,037 | 5/1970 | Sharpe | 226/88 |
| 4,580,398 | 4/1986 | Bruer | 100/5 |

Primary Examiner—John Sipos

[57] ABSTRACT

A bale wrapping mechanism for wrapping a large round bale with a wrap material such as plastic sheet material or net, is mounted to the rear of a bale discharge gate. Drive rolls are located rearwardly of the gate and are selectively drivable for dispensing wrap material onto the rear end of a guide pan extending beneath and engaged with a portion of bale-forming belts extending between lower rear and lower front belt support rolls carried by the discharge gate. A guide finger assembly is secured to the front of the pan and includes a plurality of fingers located in gaps between the bale-forming belts and including forward end portions curved arcuately about the lower front belt support roll for directing wrap material about the roll and into a pinch point defined between the belts and a bale desired to be wrapped by the material.

12 Claims, 4 Drawing Figures

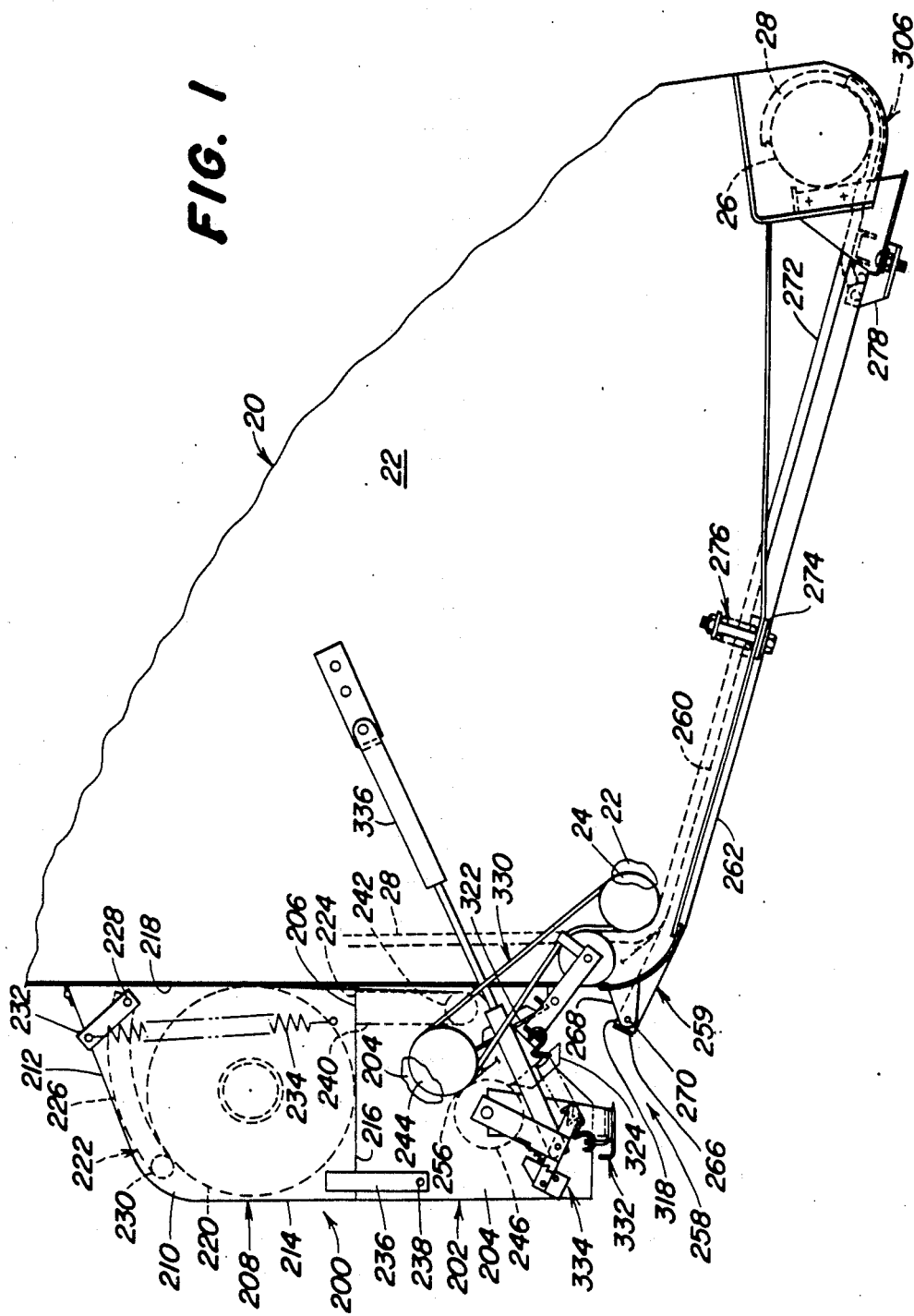

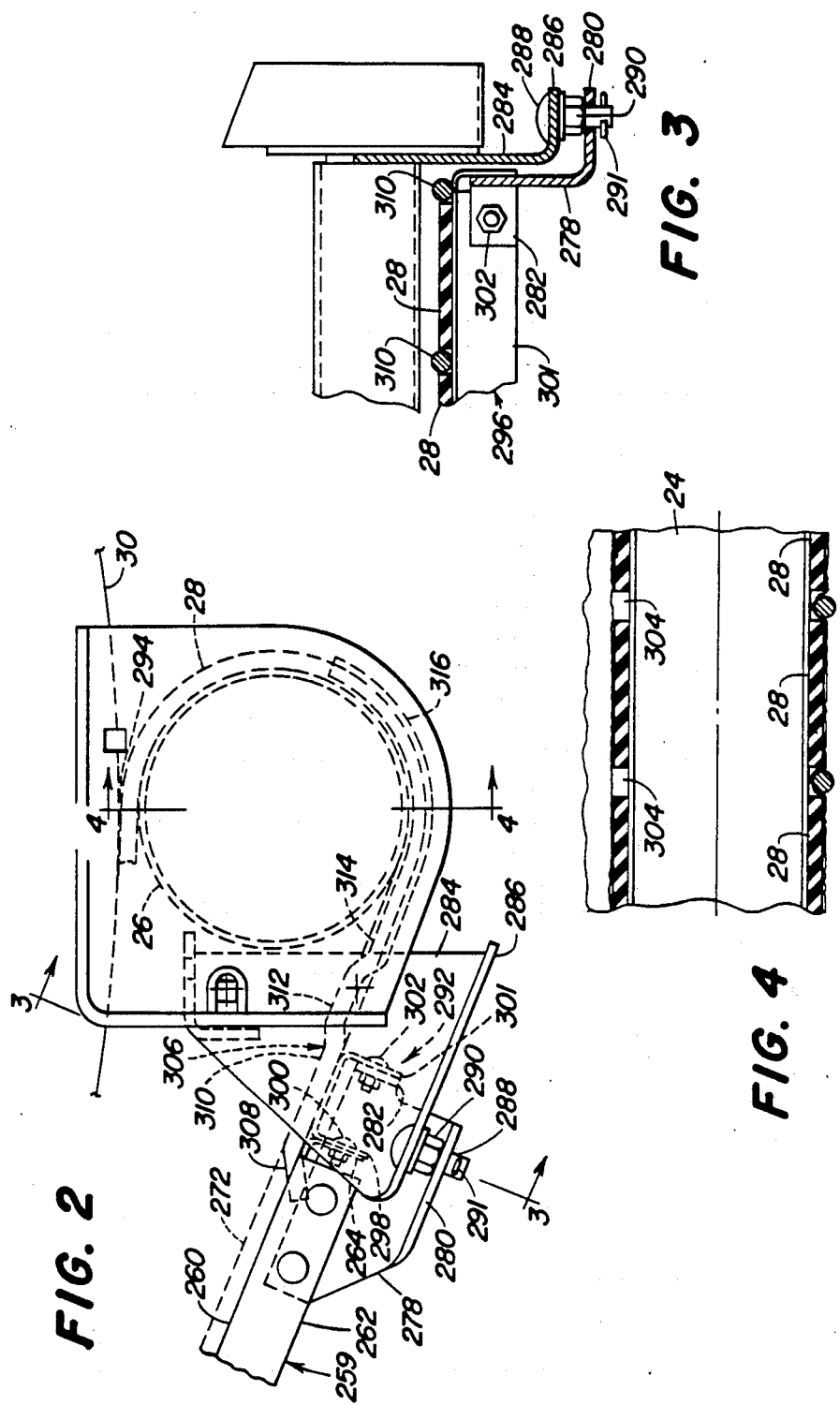

ASSEMBLY FOR GUIDING WRAP MATERIAL FROM THE REAR OF A BALER TO A BALE-FORMING CHAMBER INLET

RELATED APPLICATIONS

On a date even with the filing date of the instant application, the following commonly assigned applications were filed for covering inventions disclosed in this application:

1. Application Ser. No. 883,791 filed in the names of Verhulst et al and entitled SYSTEM FOR AUTOMATICALLY ENVELOPING A LARGE ROUND BALE WITH A WRAPPING.
2. Application Ser. No. 883,196 filed in the names of Frimml et al and entitled WRAP MATERIAL STRIPPER AND GUIDE ASSEMBLY.
3. Application Ser. No. 883,794 filed in the names of Anstey et al and entitled MECHANISM FOR FEEDING WRAP MATERIAL INTO A BALE-FORMING CHAMBER FOR ENVELOPING A LARGE ROUND BALE.
4. Application Ser. No. 883,793 filed in the name of Frerich and entitled HOUSING FOR HOLDING A SUPPLY ROLL OF LARGE ROUND BALE WRAP MATERIAL.

BACKGROUND OF THE INVENTION

The present invention relates to a wrapping mechanism for enveloping a large round bale, located within a bale-forming chamber, with a wrap material such as plastic sheet or net, for example. More particularly the present invention relates to apparatus for guiding wrap material into the bale-forming chamber of a large round baler.

The present invention is particularly adapted for use with large round balers of the type including a plurality of bale-forming belts mounted in spaced relationship across a plurality of fixed and movable rolls arranged such that the belts cooperate with opposite sidewalls of the baler to define an expansible bale chamber having an inlet located in the bottom thereof. Some of these fixed rolls are carried by a bale discharge gate which is vertically swingable to expand the chamber inlet sufficiently to discharge a bale therefrom. U.S. Pat. No. 4,428,282 issued to Anstey on Jan. 31, 1984 discloses a large round baler of this type.

The bale-forming belts of this type of baler make it necessary to feed wrap material through the bale-forming chamber inlet in order to wrap a bale located in the chamber. One known baler of this type is provided with a wrapping mechanism mounted to the rear end of the discharge gate. A problem attendant with a rear mounted mechanism is that of keeping the driven feed apparatus and material cut-off apparatus located in a relatively clean environment while at the same time providing guide apparatus for effectively guiding the wrap material from the feed apparatus to the bale chamber inlet.

SUMMARY OF THE INVENTION

According to the present invention there is provided a a wrap material guide assembly for guiding wrap material from a location rearwardly of a bale discharge gate to a bale-forming inlet.

An object of the invention is to provide a wrap material guide for effectively guide wrap material from a location at the rear of a bale discharge gate to a bale-forming chamber inlet located forwardly of the gate.

A more specific object is to provide a wrap material guide assembly including a guide pan having a flat guide surface engaged with a run of bale-forming belts extending between lower rear and lower front belt support rolls carried by the gate whereby wrap material is carried along the pan by the belts.

Yet another object is to provide a guide pan, as set forth in the previous object, which terminates behind the lower front belt support roll, and to further provide a guide finger assembly at the forward end of the guide pan for guiding wrap material exiting the pan forwardly and around the lower front belt support roll.

Still a more specific object is to provide a guide finger assembly having a plurality of fingers respectively aligned with and located in gaps between the bale-forming belts whereby the fingers serve to keep the belts properly aligned.

Another object is to mount the guide pan set forth above so that it can undergo a limited amount of movement away from the bale-forming belts so as to permit stray crop and foreign objects to pass between the bale-forming belts and the pan without inhibiting the progress of or unduly damaging the wrap material.

These and other objects will become more apparent from a reading of the ensuing description together with the appended drawing.

BRIEF DESCRIPTION OF THE DRAWINGS

FIG. 1 is a right side elevational view of a portion of a bale-discharge gate to which a wrapping mechanism having a guide assembly constructed according to the present invention is mounted.

FIG. 2 is an enlarged right side elevational view showing the forward end of the guide assembly shown in FIG. 1.

FIG. 3 is a sectional view taken along line 3—3 of FIG. 2 showing the guide pan and guide finger assembly support structure.

FIG. 4 is a sectional view taken along line 4—4 of FIG. 2 showing the guide fingers located in the gaps between the bale-forming belts.

DESCRIPTION OF THE PREFERRED EMBODIMENT

Initially, it should be noted that only one component is shown of some components described herein as occurring in pairs or multiples and it is to be understood that the construction of the component is the same as or similar to the construction of the shown component.

Referring now to the drawing, the is shown a portion of a bale-discharge gate 20 of a large round baler similar in construction to that disclosed in the aforementioned U.S. Pat. No. 4,428,282. Extending between opposite sidewalls 22 of the gate are lower rear and lower front bale-forming belt support rolls 24 and 26, respectively. A plurality of bale-forming belts 28 are supported in side-by-side, spaced relationship across the support rolls 24 and 26 and other rolls of the baler and operate in a manner set forth in the above-mentioned U.S. Pat. No. 4,428,282 to roll crop products, introduced into a bale-forming chamber formed in part by said belts into a bale 30 (FIG. 2).

A bale wrapping mechanism 200 is mounted to the rear of the gate 20 for introducing a wrapping material such as plastic sheet or net into the bale-forming chamber for enveloping the bale 30 prior to its discharge.

Specifically, the wrapping mechanism 200 includes a frame 202 including opposite vertical sidewalls 204 provided with forward vertical flanges bolted or otherwise secured to corresponding flanges forming vertical rear ends of the gate sidewalls 22. Tops of the sidewalls 204 are defined by horizontal flanges 206. A wrap material housing 208 has opposite sidewalls 210 joined together by a downwardly and rearwardly sloping top wall 212, a vertical rear wall 214, and a horizontal bottom wall 216 which terminates short of the front of the housing for defining a wrap material passage (not shown). The front of the housing 208 is closed by a vertical panel 218 extending between and joined to the gate sidewalls 22. Resting on the bottom wall 216 of the housing 208 is a roll of wrap material 220 which is biased, by means of a U-shaped structure 222 toward a corner 224 defined by the junction of a plane containing the bottom wall 216 and the panel 218. The U-shaped structure 222 includes a pair of arms 226 having forward ends respectively pivotally connected to upper forward locations of the sidewalls 210, as at pivots 228, and having rearward ends joined by a crossbar 230 which engages an upper rear area of the roll of wrap material. A rearwardly projecting arm 232 is mounted to the right pivot 228 for rotation with the arm 226 and a spring 234 is coupled between the arm 232 and the right sidewalls 210 so as to urge the crossbar 230 against the roll of wrap material 220. The housing 208 is mounted to the sidewalls 204 by a pair of straps 236 depending from lower rear locations of the sidewalls 210 and respectively coupled to the sidewalls 204 by pivots 238. A pair of spreader roll support legs 240 are secured to and depend from inner front locations of the housing sidewalls 210. Extending between and rotatably mounted adjacent the bottoms of the legs 240 is a wrap material spreader roll 242 comprising a cylindrical roll having spiral flighting (not shown) at opposite ends thereof and with the spirals being of opposite hand for acting on the wrap material to "feed" the opposite edges thereof toward the opposite sidewalls 204. When the housing is in a closed portion, as show, the spreader roll 242 is disposed for rotation about an axis located forwardly of and below an axis of rotation of a wrap material drive roll 244 which is rotatably supported in the opposite sidewalls 204. A rear portion of the periphery of the spreader roll 242 is located very close to and slightly beneath a forward portion of the periphery of the drive roll 244. A rear wrap material drive roll 246 extends between and has opposite ends rotatably supported by the sidewalls 204 at a location below and rearwardly of the axis of rotation of the front drive roll 244. The drive rolls 244 and 246 include respective elastomeric surfaces which are in tight frictional engagement with each other so as to define a pinch point 256 for gripping wrap material fed therebetween. After a new roll of wrap material 220 is loaded in the open housing 208, a length of wrap material is pulled from the roll, placed over the spreader roll 242 and normally fed into the drive rolls 244 and 246. The housing 208 is then closed resulting in the length of wrap material 257 being tightly wrapped about approximately three-fourths of the periphery of the drive roll 244.

A wrap material guide assembly 258 is provided for guiding wrap material exiting from the drive rolls 244 and 246 towards the bale-chamber inlet located forwardly of the bale-forming belt support roll 24. Specifically the assembly 258 includes a wrap material guide pan 259 constructed of a noncorrosive material capable of presenting a slick guiding surface for the wrap material. Stainless steel and some plastics, for example, exhibit these characteristics. The pan 259 shown here is preferably formed from a rectangular blank of stainless steel sheet and includes a rectangular main section 260 having opposite depending side flanges 262, a front flange 264 and a rear flange 266. The pan 259 is mounted between lower portion of the gate sidewalls 22. A pair of brackets 268 project rearwardly from the lower rear locations of the sidewalls 22 and are pivotally joined to rear ends of the pan side flanges 262 by a pair of axially aligned pins 270. The main section 260 of the pan has a smooth upper surface engaged with bale-forming belt portions 272 extending between the lower rear and lower front rolls 24 and 26, respectively, carried by the gate 20. Joined to the opposite pan side flanges 262 at locations medially of the front and rear ends of the pan are tabs 274 which project outwardly beneath the opposite gate sidewalls 22. A pair of spring assemblies 276 are coupled between the sidewalls 22 and the tabs 274 and act to bias the pan upwardly about the pivot pins 270 to yieldably hold the section 260 of the pan in engagement with the bale-forming belt portions 272. The forward end of the pan 259 terminates rearwardly of the roll 26. As can best be seen in FIGS. 2 and 3, respectively coupled to the forward ends of the side flanges 262 are depending brackets 278 having outturned bottom ends 280, extending parallel to the pan upper surface, and inturned forward ends 282 spaced forwardly of and extending parallel to the pan front flange 264. A pair of brackets 284 are respectively secured to the interior of the gate sidewalls 22 at locations just rearwardly of the roll 26 and have respective outturned bottom ends 286 extending parallel to the bottom ends 280 of the brackets 278. The bracket bottom ends 280 and 286 at each side of the baler are provided with aligned holes and received in the aligned holes is a bolt 288 secured to the bracket bottom end 286 by a nut 290 located between the bracket bottom ends 280 and 286. The bolt 288 has a hole therein located below the bracket ends 280 and containing a cotter pin 291. The distance between the bottom end of the nut 290 and the cotter pin 291 is such as to permit the guide pan 259 to pivot downwardly about the pins 270 in the event that stray crop or a foreign object such as a stone finds its way between the pan 259 and the belt portions 272, such pivoting permitting the stray crop or foreign object to move along the pan without seriously inhibiting the progress of or damaging the wrap material when such is present.

A guide finger assembly 292 is fixed ahead of the pan 259 for guiding wrap material exiting from the front of the pan around the roll 26 a distance sufficient for the material to be grabbed at a pinch point 294 formed by the bale-forming belts 28 and the bale 30. Specifically, the guide finger assembly 292 comprises a downwardly opening, transverse channel member 296 having a web forming a coplanar extension of the upper pan surface, having a rear leg 298 secured to the pan front flange 264 by a plurality of fasteners 300 and having a front leg 301 having opposite ends secured to the fronts of the inturned forward ends 282 of the brackets 278 by a pair of fasteners 302. Spaced across and secured to the channel member 296 at locations corresponding to gaps 304 (FIG. 4) between the bale-forming belts 28 are a plurality of guide fingers 306 in substantially the same plane as the belts. The guide fingers 306 are formed of rods which are circular in cross-section and have a diameter approximately equal to the thickness of the bale-forming belts 28. Considered from rear to front, each finger 306 includes a rear end section 308 angled upwardly and forwardly through a forward location of the main pan section 260, a straight section 310 welded across the web of the channel member 296, an upwardly offset section 312 extending partly above the belts 28, a second straight section 314 extending partly below the belts 28 and parallel to the straight section 310, and a forward end section 316 curved arcuately about the bottom and lower front periphery of the roll 26 and having its entire length partly radially outwardly of the belts 28. It will be appreciated that the fingers 306 are shaped and mounted so as to not impede the progress of wrap material as it exits the guide pan 259 while buckling the wrapper around said fingers and into the spaces between the belts and directing the wrap material around the roll 26 to the pinch point 294. At the same time, the fingers 306 act to keep the belts 28 in proper alignment so that they will apply an even pull across the width of the wrap material during wrapping of the bale.

The portion of the wrap material material guide pan 259 which projects rearwardly beyond the gate 20 includes an upper surface 318 located beneath a plane extending tangentially to the drive rolls 244 and 246 and intersecting the pan section 260 approximately at a pinch point 320 defined between the pan and the bale-forming belts 28 where the latter pass around the bale-forming belt support roll 24. Respectively associated with the drive rolls 244 and 246 are sheet metal wrap material guides 322 and 324 which extend between and are secured to th sidewalls 204. The guides 322 and 324 include respective flat portions extending forwardly from the peripheries of the rolls 244 and 246 at locations above and below the plane extending tangentially to the rolls.

A drive assembly 330 is provided for selectively driving the drive rolls 244 and 246 when it is desired to pull wrap material from the supply roll 220 to wrap a bale in the chamber; a cut-off knife assembly 332 is provided for selectively severing the wrap material at a location just beyond the guide 322 when a desired amount of wrap material has been applied to the bale; and a hydraulically operated latch assembly 334 is associated with the drive and cut-off assemblies for coordinating their operation. A detailed description of these assemblies is omitted for brevity since they do not form part of the present invention. Suffice it to say that a hydraulic cylinder 336 forming part of the latch assembly 334 when extended as shown disposes the latch assembly for simultaneously establishing a drive roll drive condition and for holding the cut-off knife assembly in a cocked position. The drive rolls 244 and 246 are then driven to feed a previously severed end of the wrap material to the pan surface 318 and into the pinch point 320 where the bale-forming belt portions 272 engage the wrap material and carry it first along the pan section 260 and then along the guide fingers 306 and into the pinch point 294 where the bale 30 then cooperates with the belts 28 to cause the wrap material to envelope the bale circumference. Once the bale is wrapped as desired, the cylinder is retracted with initial retraction releasing the knife assembly 332 from the latch assembly 334 and thus allowing a spring 338, connected between the drive and latch assemblies 330 and 334, to unload and swing the knife assembly to sever the wrap material. At the same time the spring acts to disengage the drive roll drive. Complete retraction of the cylinder results in latch assembly 334 once again engaging the knife assembly 332 so that extension of the cylinder 336 will once again cock the cut-off knife assembly.

It is to be noted that should stray crop material or foreign objects become trapped between the belt portions 272 and the pan section 260 or on the guide fingers 306, such crop or objects may be easily removed by merely releasing the spring assemblies 276 and removing the cotter pins 291 to permit the pan 259 to pivot downwardly about the pins 270.

I claim:

1. In a large round baler including a bale discharge gate, lower rear and front bale-forming belt support rolls rotatably supported in opposite sidewalls of the gate, a plurality of bale-forming belts supported around and across the support rolls in spaced relationship to each other, and a wrapping mechanism mounted to the discharge gate, the improvement comprising: an assembly for guiding wrap material from a location adjacent the lower rear roll to a location adjacent the lower front roll; said assembly including a guide pan extending between the opposite sidewalls and having a flat guide surface located beneath and engaged with said bale-forming belts and terminating rearwardly of said lower front roll to guide said material between said surface and said belts; and a guide finger assembly mounted to a forward end location of the guide pan to guide said material between said finger assembly and said belts and including a plurality of guide fingers respectively protruding into the spaces between adjacent belts and located substantially in the same plane as said belts, with each finger curving arcuately about a lower portion of the lower front roll to buckle the wrapper around said fingers and into the spaces between the belts.

2. The large round baler defined in claim 1 wherein said finger assembly includes a U-shaped channel located ahead of the pan and having a web generally coplanar to the guide surface; and said fingers being secured to the web of the channel.

3. The large round baler defined in claim 2 wherein the fingers each include a straight portion welded to the web.

4. The large round baler defined in claim 2 wherein the fingers each include a rear end portion angled downwardly and rearwardly through the guide surface.

5. The large round baler defined in claim 1 wherein the fingers have a cross-sectional dimension about equal to a thickness of each of the bale-forming belts; and each finger having an upwardly offset section located just behind the lower front roller so as to partly project above the belts so as to enhance a belt guiding function of the fingers.

6. The large round baler defined in claim 1 wherein said guide pan has a rearward end location mounted to the gate by a transverse pivot connection; support means coupled between opposite side locations of a forward end of the guide pan and the gate sidewalls and including connection means permitting a limited amount of downward movement of the pan about the pivot connection.

7. The large round baler defined in claim 6 wherein the support means includes a first pair of brackets respectively coupled to opposite sides of the guide pan and having respective outturned bottom ends; a second pair of brackets respectively secured to the opposite sidewalls of the gate and having respective outturned bottom ends spaced vertically above and paralleling the outturned bottom ends of the first pair of brackets; a pair of bolts respectively secured to the outturned bottom ends of the second pair of brackets and having lower ends slidably projecting through holes provided in the outturned bottom ends of the first pair of brackets; a pair of fasteners respectively received in the pair of bolts at a location spaced beneath the outturned bottom ends of the second pair of brackets; and a pair of spring assemblies respectively coupled between the pair of gate sidewalls and opposite side locations of the guide pan and normally biasing the latter upwardly against the bale-forming belts.

8. The large round baler defined in claim 2 wherein said guide pan is formed from a rectangular sheet of metal so as to include a main flat section defining the flat guide surface, front and rear depending flanges and opposite depending side flanges; and said U-shaped channel having a leg secured to said front flange.

9. The large round baler defined in claim 8 wherein rearward location of the opposite side flanges are vertically pivotally connected to the gate; a first pair of brackets respectively being secured to opposite front locations of the opposite side flanges and including outturned bottom ends; a second pair brackets respectively being secured to the opposite gate sidewalls and having respective outturned ends spaced above and in parallel relationship to the outturned bottom ends of the first pair of brackets; connection means joining the outturned bottom ends of the first and second brackets and permitting a limited amount of movement of the main flat section of the guide pan away from the bale-forming belts, and biasing means coupled between the gate and the guide pan for yieldably biasing the latter against the bale-forming belts.

10. The large round baler defined in claim 9 wherein said first pair of brackets each have an inturned forward end disposed forwardly of and secured to a forward leg of the U-shaped channel member.

11. In combination with a large round baler having a set of belts forming at least part of a bale chamber and being supported in spaced side by side relationship across and being directed around a portion of the periphery of a belt support roll, a guide finger assembly for guiding bale wrapping material about the belt support roll, comprising: an elongate, finger support member extending crosswise to the belts and mounted in the vicinity of the support roll; a plurality of wrap guide fingers secured to the support member to guide said material between said finger assembly and said belts and, respectively, protruding between adjacent ones of the belts and located substantially in the same plane as said belts; and said fingers each including an end section curved arcuately about a peripheral portion of the belt support roll to buckle the wrapper around said fingers and into the spaces between the belts.

12. The guide finger assembly defined in claim 11 wherein the elongate transverse member is formed by a U-shaped channel member and the fingers each include a straight portion welded across a web of the channel member and extending substantially tangentially to the roll.

* * * * *